(12) United States Patent
Armienta

(10) Patent No.: US 6,490,796 B1
(45) Date of Patent: Dec. 10, 2002

(54) MULTI-USE KITCHEN TOOL

(76) Inventor: Andrew J. Armienta, 209 Torvend Way, Patterson, CA (US) 95363

( * ) Notice: Subject to any disclaimer, the term of this patent is extended or adjusted under 35 U.S.C. 154(b) by 0 days.

(21) Appl. No.: 09/533,575

(22) Filed: Mar. 23, 2000

Related U.S. Application Data

(60) Provisional application No. 60/134,169, filed on May 13, 1999.

(51) Int. Cl.$^7$ ................................................ A47J 43/28
(52) U.S. Cl. ............................. 30/142; 30/149; 30/325
(58) Field of Search .......................... 30/136, 141, 142, 30/148, 149, 324, 325, 169; 294/2, 7; 97/643, 691

(56) References Cited

U.S. PATENT DOCUMENTS

| | | | |
|---|---|---|---|
| 631,713 A | 8/1899 | Goodwin | |
| 944,091 A | * 12/1909 | Harn | 30/142 |
| 1,108,813 A | * 8/1914 | Tartiss | 30/142 |
| D49,368 S | * 7/1916 | Osterbauer | |
| D50,133 S | 1/1917 | Johnson | |
| 1,452,464 A | 4/1923 | Isaacs | |
| 1,969,162 A | 8/1934 | Smith | 259/144 |
| D148,777 S | 2/1948 | Ferris | D44/29 |
| 2,593,674 A | 4/1952 | Harnsberger | 30/142 |
| 2,799,086 A | * 7/1957 | Tupper | 30/142 |
| 3,004,341 A | 10/1961 | Carroll et al. | 30/325 |
| 3,224,091 A | * 12/1965 | Scigliano | 30/142 |
| 3,967,376 A | * 7/1976 | Foley | 30/150 |
| 4,711,029 A | 12/1987 | Somerset | 30/148 |
| 5,573,292 A | 11/1996 | Citino | 294/7 |

FOREIGN PATENT DOCUMENTS

| | | | | |
|---|---|---|---|---|
| CA | 471558 | * | 2/1951 | 30/142 |
| GB | 518035 | * | 2/1940 | 30/325 |

* cited by examiner

*Primary Examiner*—Hwei-Siu Payer
(74) *Attorney, Agent, or Firm*—Henneman & Saunders; Larry E. Henneman, Jr.

(57) ABSTRACT

A cooking utensil includes a body with a depressed portion, a handle extending from the body in a first direction, and a blade extending from the body in a second direction not parallel to the first direction. The body has a curved leading edge that is continuous with a lateral edge of the blade. The upper boundaries of the depressed portion of the body form a plane that makes a non-zero angle with the plane of the blade. A leading edge of the blade is sharpened to facilitate use of the utensil as a cleaver.

21 Claims, 3 Drawing Sheets

MULTI-USE KITCHEN TOOL

RELATED APPLICATIONS

This application is a continuation-in-part of U.S. Provisional Application Ser. No. 60/134,169, filed by the same inventor on May 13, 1999, and which is incorporated herein by reference in its entirety.

BACKGROUND OF THE INVENTION

Field of the Invention

This invention relates generally to culinary implements, and more particularly to a utensil that performs multiple culinary tasks.

In any kitchen, whether restaurant or private, there are numerous tools designed to aid in the preparation of food. Common kitchen tools include spoons, spatulas, cleavers, and the like. The spoon has a function of scooping and retaining various foods, including gravies and other liquids. It is common for spoon to have drainage slots or holes for allowing the passage of a fluid (e.g., broth), while retaining larger pieces of solid food. A spatula is useful for turning, lifting, and transferring foods. A spatula typically has a flat blade with a leading edge that allows the blade to slip between foods and a cooking surface (e.g., the bottom of a pan or a griddle). The spatula, like the spoon, commonly contains drainage openings designed to allow liquids such as grease or oil to pass through them. A cleaver is a sharp, tall bladed knife typically used for chopping or slicing foods. The cleaver aids in the processing of foods that require a more specialized utensil than a standard knife, such as foods already being prepared in a deep pan, or foods that require more force to be chopped (e.g., hard vegetables or meats).

While each of the above described utensils is particularly useful for its intended purpose, using multiple utensils simultaneously results in many inconveniences. One problem associated with using multiple utensils is their use of kitchen space. Each utensil requires its own counter-space, to be rested on when not in use by the chef, and its own cupboard space to be stored in. Resting each utensil on the counter when cooking consumes the chef's valuable work area, and increases the mess resulting from excess food residue on the utensils, which must be cleaned up. Furthermore, purchasing multiple utensils is costly, because well-made kitchen utensils are expensive. In addition, switching between various utensils while preparing foods consumes the chef's valuable time. This loss of time, even if small, can cause over-cooking of certain foods and the resultant waste of food that is then not suitable for serving. All of these problems contribute to chef frustration in their attempt to timely prepare high quality food.

The use of known individual utensils also inherently limits the functionality of each particular utensil to its intended purpose, and there are some combined functions for which no utensil exists. For example, when cooking an omelet in a frying pan with a curved side, there is no known utensil for lifting and turning the omelet (e.g., spatula function) and detaching the omelet from the curved side wall of the pan. The straight leading edged of the spatula does not conform to the curved wall of the pan.

What is needed is a kitchen utensil that combines the specialized functions of various culinary implements in a single utensil, in order-to minimize the inconveniences and expense associated with using separate utensils. What is also needed is a utensil that combines the functionality of known, individual utensils into a single utensil.

SUMMARY

The present invention overcomes the problems associated with the prior art by combining the functions of multiple culinary implements into a single, novel kitchen utensil, thus reducing the cost and inconvenience of using multiple utensils.

One particular embodiment of the present invention includes a body having a depressed portion (e.g., a spoon) formed therein, a handle extending from the body in a first direction, and a blade (e.g., a spatula) extending from the body in a second direction. Optionally, the depressed portion of the body and/or the blade defines one or more apertures to facilitate fluid flow therethrough. The handle and the blade extend in directions that are not parallel to one another. In a more particular embodiment, the handle and the blade are perpendicular to one another. Additionally, the plane of the blade forms a nonzero angle with a plane defined by the upper boundary of the depressed portion of the body (e.g., spoon lip).

The body includes a curved leading edge designed to uniformly contact a curved wall of a cooking container. In a more particular embodiment the curved leading edge of the body is detachable to facilitate the use of leading edges of varying contours.

The flat blade extending from the body includes a flat lateral edge adapted to contact the bottom surface of the cooking container. Optionally, the lateral edge of the blade is continuous with the curved leading edge of the body. In a particular embodiment the blade includes a sharpened leading edge to facilitate the chopping and slicing of foods. In addition, the sharpened leading edge of the blade facilitates the lifting of food from the bottom of a cooking container, as does the lateral edge of the blade, such that the blade can function as a spatula in either the forward or lateral direction.

BRIEF DESCRIPTION OF THE DRAWINGS

The present invention is described with reference to the following drawings, wherein like reference numbers denote substantially similar elements.

DETAILED DESCRIPTION

Figure 1:
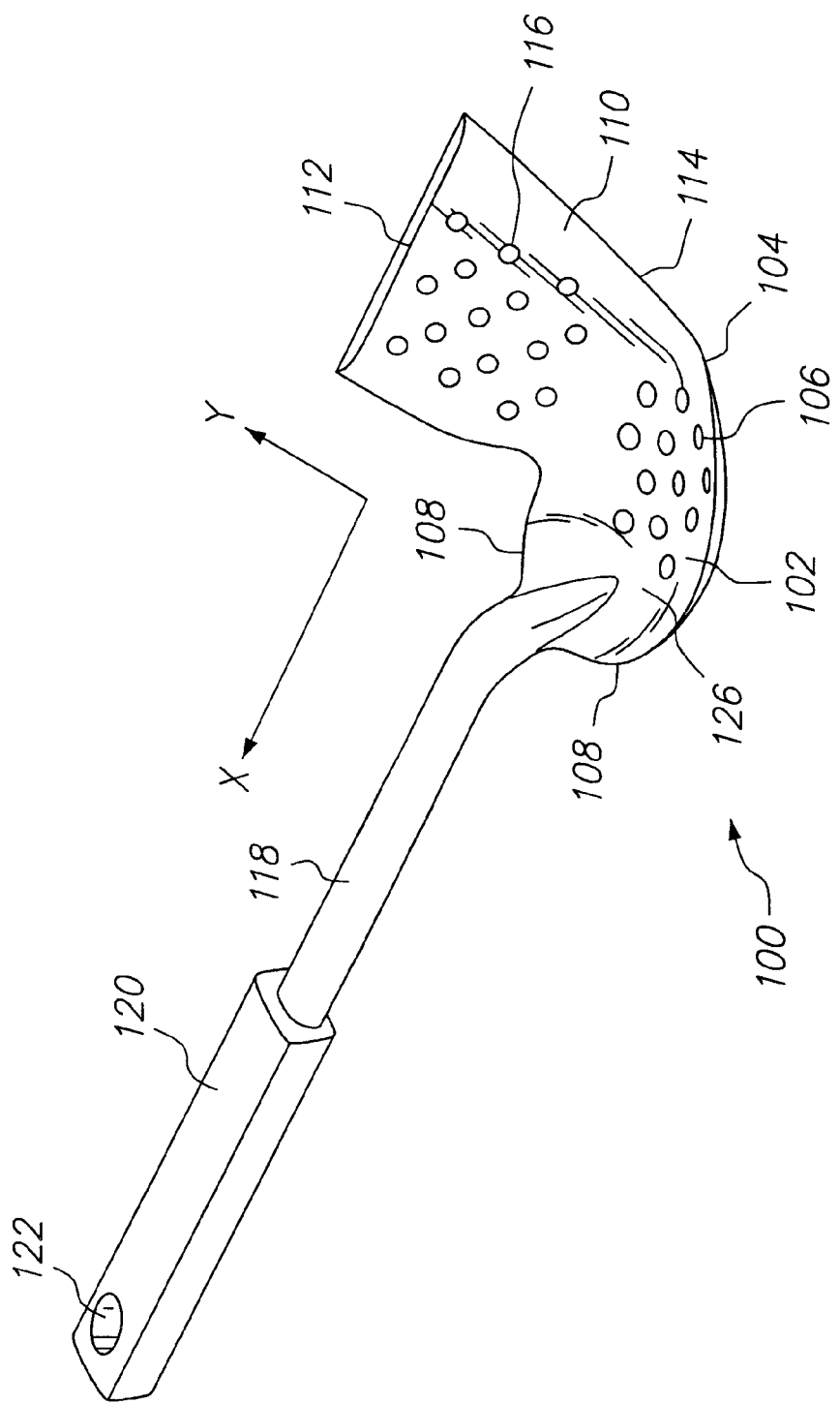
FIG. 1 shows a perspective view of a cooking utensil in accordance with the present invention.

The present invention overcomes the problems of the prior art by providing a single cooking utensil that performs multiple cooking functions. In the following description, numerous specific details are set forth (e.g. construction materials, fluid apertures, etc.) in order to provide a thorough understanding of the invention. Those familiar with culinary implements will-recognize, however, that the invention may be practiced apart from these specific details. FIG. 1 is a perspective view of cooking utensil 100, according to one embodiment of the present invention. Cooking utensil 100 includes a metallic body 102 (a spoon portion), a metallic handle 118 extending from body 102 in a first direction (X), and a flat, metallic blade 110 (a spatula portion) extending from body 102 in a second direction (Y). In this particular embodiment, handle 118 and blade 110 are disposed roughly perpendicular to one another. Body 102 includes a depressed portion 126, a plurality of apertures 106, an upper boundary (spoon lip) 108, and a curved leading edge 104. The length of blade 110 (spatula) and the width of depressed portion 126 of body 102 (spoon) are measured along the second direction (Y). Note that the length of blade 110 is at least as long as the depressed portion's width. Blade 110 includes a leading edge 112, a lateral edge 114, and a plurality of apertures 116. Handle 118 includes an insulated portion 120, and a hanging aperture 122.

Body 102 collects and retains food in depressed portion 126. Curved leading edge 104 is fashioned to facilitate uniform contact with a curved side-wall of a cooking container (e.g. the curved side of a frying pan), and functions to thoroughly detach any food adhering to the curved side-wall. In addition, leading edge 104 provides a larger contact area between body 102 and the cooking container than does a conventional spoon. This large contact area makes it easier to scoop slippery and/or diced foods from the cooking container. Optional apertures 106 allow fluids (e.g., grease, oil, broth, etc.) to flow out of depressed portion 126.

Blade 110 is attached to body 102 along upper boundary 108 of depressed portion 126. Blade 10 extends away from body 102 in direction (Y), and lies in a plane that forms a non-zero angle with the plane defined by upper boundary 108 of body 102. This angular relationship between blade 110 and body 102 allows blade 110 to lie flat on a cooking surface when body 102 is held at an angle to the cooking surface, without interference by depressed portion 126 of body 102. Leading edge 112 and lateral edge 114 of blade 110 permit the scooping of food (typically solid food) onto blade 110 and, optionally, into body 102. Typically, spatula type utensils scoop food using a forward motion, however, by utilizing both lateral edge 114 and leading edge 112 of cooking utensil 100 scooping may be accomplished by both lateral and/or forward motion. In this particular embodiment of cooking utensil 100, lateral edge 114 of blade 110 is continuous with leading edge 104 of body 102. This allows for simultaneous food collection from a curved side-wall and the bottom of a cooking container. Leading edge 112 is also sharpened to facilitate the slicing or chopping of food. Because blade 110 extends in a direction (Y) roughly perpendicular to handle 118, utensil 100 can be conveniently used as a cleaver. Blade 110 optionally includes a plurality of apertures 116 for allowing fluid to flow through blade 110.

Cooking utensil 100 may be produced using a variety of materials including, but not limited to, metal, nylon, plastic, and wood. Each material offers it own particular advantages and disadvantages, and so material selection will depend on the intended use of utensil 100. For example, fabricating cooking utensil 100 from metal allows leading edge 112 of blade 110 to be sharpened and to retain a sharp edge. In addition, metal provides added strength and durability that may be required in some applications to use cooking utensil 100 as a cleaver. On the other hand, metal is more expensive, and must include insulated portion 120 or similar protection for the user against burns caused by heat transfer from the cooking container to cooking utensil 100. As another example, if utensil 100 is intended for use with cookware having a non-stick surface or other surface susceptible to damage from scratching, it may be desirable to manufacture utensil 100 from nylon or plastic. Additionally, plastic utensils are generally less expensive to manufacture than their metal counterparts. On the other hand, plastics are not generally as strong as metals, and some plastics might not, therefore, be suitable in applications such as cleaving meat. Plastic would, however, be suitable for cleaving soft foods such as scrambled eggs Manufacturing different portions of utensil 100 of different material types is also possible. For example, both body 102 and handle 118 may be fashioned from nylon, while blade 110 may be fashioned from metal, with leading edge 112 of blade 110 is sharpened as described above. This alternate embodiment would be a lightweight utensil capable of chopping and/or slicing tougher foods, as well as remaining cool when used with high temperatures.

Figure 2:
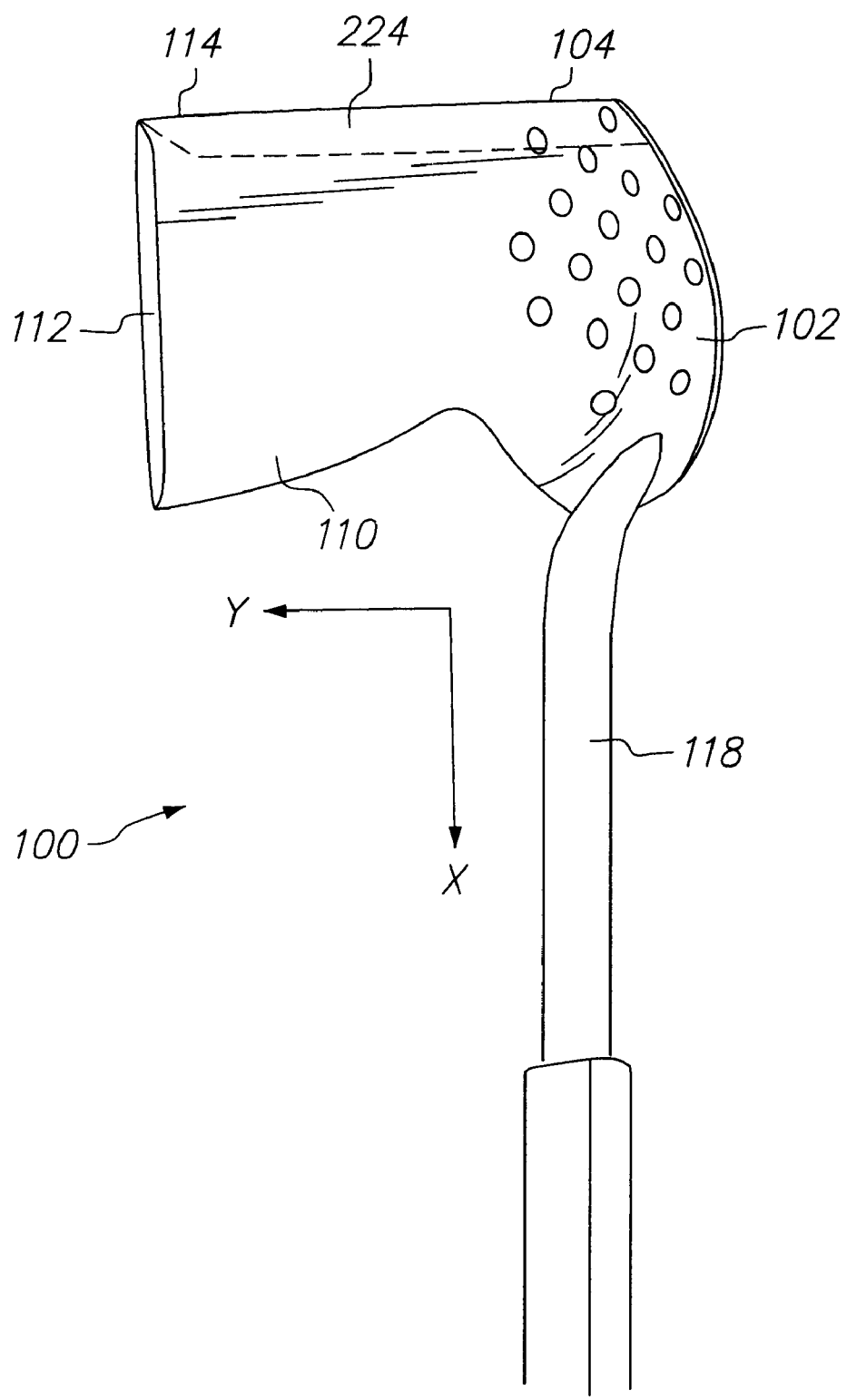
FIG. 2 shows a top view of the cooking utensil shown in FIG. 1.

FIG. 2 displays a top view (blade 110 lying in the plane of the page) of cooking utensil 100. As described above, blade 110 extends from body 102 in a direction roughly perpendicular to the extending direction of handle 118. The view of FIG. 2 illustrates how utensil 100 can function as a cleaver. Utensil 100 can be used to chop foods with leading edge 112 by swinging utensil 100 in direction (Y) by handle 118. Utensil 100 can be used to slice foods with leading edge 112 by drawing utensil 100 back and forth along direction (X).

In an alternate embodiment, leading edge 104 of body 102 and/or lateral edge 114 of blade 110 are embodied in a detachable component 224 (shown representationally by the dotted line in FIG. 2). For example, component 224 can be formed from a heat resistant plastic and be adapted to slip over leading edge 104 and lateral edge 114. This particular embodiment has the advantage that various detachable components could be used with a single utensil 100 to facilitate uniform contact with cooking containers having various sizes and/or unique curvatures. Furthermore, detachable component 224 provides protection against abrasions caused by a metallic body 102, thus achieving the above described advantages of a metallic utensil (e.g., strength, etc.) in addition to the advantages of plastic (e.g., won't damage cookware).

Figure 3:
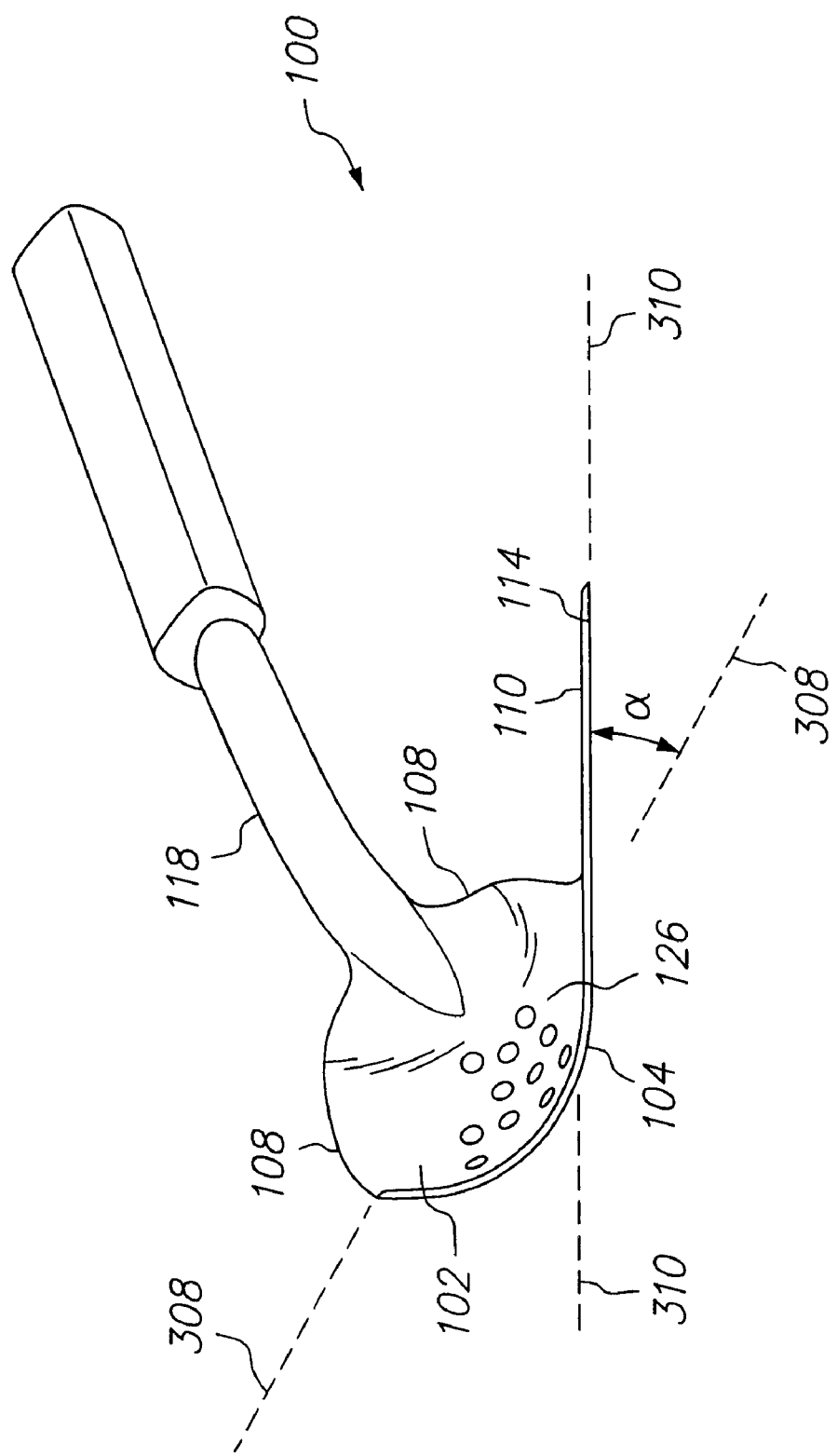
FIG. 3 shows a leading edge view of the cooking utensil shown in FIG. 1.

FIG. 3 is an edge view of continuous leading edge 104 of body 102 and lateral edge 114 of blade 110. The curvature of leading edge 104 facilitates uniform detachment of foods adhering to the curved side-wall of a cooking container (e.g. a frying pan) while lateral edge 114 slips under and detaches foods adhering to the bottom of the cooking container.

The angular relationship between body 102 and blade 110 insures that body 102 will not interfere with blade 110 lying flat on the bottom of a cooking surface. An upper plane 308 is defined by upper boundary 108 of depressed portion 126. Blade 110 lies in a second plane 310, which intersects upper plane 308 at a non-zero angle, alpha ($\alpha$). Ideally, lateral edge 114 is tangent to leading edge 104 at angle alpha ($\alpha$), but those skilled in the art will understand that, in some cases, it may be desirable to increase or decrease this angle to accommodate particular contours of cooking surfaces. When angle alpha is decreased beyond the point where lateral edged 114 is tangent to leading edge 104, at least a portion of depressed portion 126 is disposed below blade plane 310, and therefore interferes with blade 110 lying flat on a cooking surface. If alpha is decreased to 0 degrees, then the entire depressed portion 126 of body 102 would lie beneath plane 310.

The detailed description of particular embodiments of the present invention is now complete. Many of the described features may be substituted, altered, or omitted without departing from the scope of the invention. Accordingly, no single feature is considered to be an essential element of the present invention, and the scope of the invention is only limited by the following claims which may be amended during the prosecution of the application.

I claim:

1. A cooking utensil comprising:
    a body having a depressed portion formed therein;
    a handle extending from said body in a first direction; and a blade extending from said body in a second direction not parallel to said first direction; and wherein the length of said blade along said second direction is at least as long as said depressed portion's width along said second direction; and an upper boundary of said depressed portion of said body lies in a first plane that forms a non-zero angle with said blade.

2. A cooking utensil according to claim 1, wherein said depressed portion of said body defines at least one aperture to facilitate fluid flow therethrough.

3. A cooking utensil according to claim 1, wherein said body includes a curved leading edge adapted to contact a side wall of a cooking container.

4. A cooking utensil according to claim 3, wherein said blade includes a straight, lateral edge adapted to contact a bottom surface of said cooking container.

5. A cooking utensil according to claim 4, wherein said leading edge of said body and said lateral edge of said blade are continuous.

6. A cooking utensil according to claim 1, wherein said first direction is perpendicular to said second direction.

7. A cooking utensil according to claim 1, wherein said blade contains at least one aperture to facilitate fluid flow therethrough.

8. A cooking utensil according to claim 1, wherein said blade includes a sharp leading edge opposite said body.

9. A cooking utensil according to claim 8, wherein said body includes a curved leading edge adapted to contact a side wall of a cooking container.

10. A cooking utensil according to claim 9, wherein said blade includes a straight lateral edge adapted to contact a bottom surface of said cooking container.

11. A cooking utensil comprising:

a body having a depressed portion formed therein;

a handle extending from said body in a first direction;

a blade extending from said body in a second direction not parallel to said first direction; and a detachable component adapted to be attached to a leading edge of said body to facilitate uniform contact with a cooking container having a particular contour.

12. A cooking utensil comprising:

a spoon having a handle; and a spatula extending from a lateral edge of said spoon in a first direction not parallel to said handle; and wherein said spatula is at least as long as said spoon's width along said first direction; and a lip of said spoon lies in a first plane that forms a non-zero angle with said spatula.

13. A cooking utensil according to claim 12, wherein said spoon contains at least one aperture to facilitate fluid flow therethrough.

14. A cooking utensil according to claim 12, wherein said spoon includes a curved leading edge adapted to contact a side wall of a cooking container.

15. A cooking utensil according to claim 14, wherein said spatula includes a straight, lateral edge adapted to contact a bottom of said cooking container.

16. A cooking utensil according to claim 12, wherein said spatula extends in a direction perpendicular to said handle of said spoon.

17. A cooking utensil according to claim 12, wherein said spatula contains at least one aperture to facilitate fluid flow therethrough.

18. A cooking utensil according to claim 12, wherein said spatula includes a sharp leading edge opposite said spoon.

19. A cooking utensil according to claim 18, wherein said spoon includes a curved leading edge adapted to contact a side wall of a cooking container.

20. A cooking utensil according to claim 19, wherein said spatula includes a straight lateral edge adapted to contact a bottom surface of said cooking container.

21. A cooking utensil comprising spoon having a handle;

a spatula extending from a lateral edge of said spoon in a first direction not parallel to said handle; and a detachable component adapted to be attached to a leading edge of said spoon to facilitate uniform contact with a cooking container having a particular contour.

* * * * *